INVENTOR.
WILLIAM H. HEMBD
BY JAMES HARRAND

Wells & St. John
ATTYS.

INVENTOR.
WILLIAM H. HEMBD
JAMES HARRAND
BY

Wells & St. John
ATTYS.

United States Patent Office 3,429,052
Patented Feb. 25, 1969

3,429,052
DEVICE FOR DAMPENING DIAL AND INDICATOR OSCILLATIONS IN AN INSTRUMENT FOR MEASURING ANGULAR BODY MOVEMENTS
William H. Hembd and James H. Harrand, Spokane, Wash., assignors to Jack R. Leighton, Spokane, Wash.
Filed June 30, 1967, Ser. No. 650,388
U.S. Cl. 33—220  7 Claims
Int. Cl. A61b 5/10; B23q 17/04; G01c 9/08

ABSTRACT OF THE DISCLOSURE

The disclosure describes a sensitive instrument having a circular dial and a circular indicator for measuring the angular body movements of human beings. Dampening devices are mounted to the backs of the dial and indicator. Each of the dampening devices has an annular rim that is U-shaped in cross section to form an enclosed groove with the dial or indicator. The groove is partially filled with a high density liquid, such as mercury, for resisting the oscillationary movement of the dial or indicator.

Background of the invention

This invention is concerned with an improvement to the instrument for measuring angular body movements invented by Dr. Jack R. Leighton and which is the subject of Patent No. 2,565,381 issued Aug. 21, 1951. More particularly, the invention concerns devices for dampening the oscillations of the rotatable dial and indicator members of the instrument.

The sensitive instrument described in the above mentioned patent measures the degree of flexion of the various joints of the human body. The instrument is very useful in making physical examinations and studying the progress of patients suffering from poliomyelitis, arthritis, rheumatism, fractures, and the like, in which the normal joint flexibility has been impaired. Often well-known types of treatments such as massage, exercise and infrared ray exposures are helpful in restoring normal flexibility. It is very important to the practitioner to be able to initially determine the condition of the patient and then to accurately measure the progress made with a particular type of treatment. Such an instrument has been found useful in rehabilitation clinics and for practitioners that specialize in physical therapy.

For a complete examination and testing of the flexibility of a persons joints it is necessary to make some 30 separate measurements. This has proven to be somewhat time consuming, even when administered by a skilled operator. It has been found that for a complete test it takes approximately forty minutes per patient. Contributing to the time required in measuring the flexibility of a joint has been the increment of time necessary to permit the sensitive dial and pointer of the instrument to come to rest due to the oscillations of the dial and indicator occasioned by the movement of the part of the body being tested.

One of the principal objects of this new invention is to decrease the time required to perform the tests by reducing the oscillation period of the dial and indicator without adversely affecting the sensitivity and accuracy of the instrument.

An additional object of this invention is to provide a novel dampening device in combination with a new indicator that is efficient in operation, simple in construction, and economical to manufacture.

A further object of this invention is to provide an ingenious dampening arrangement that does not have moving parts.

These and further objects of this invention will become apparent upon reading the following description of a preferred embodiment of the invention.

Brief description of the drawings

A preferred embodiment of this invention is shown in the accompanying drawings, in which.

Description of the preferred embodiment

Figure 1:
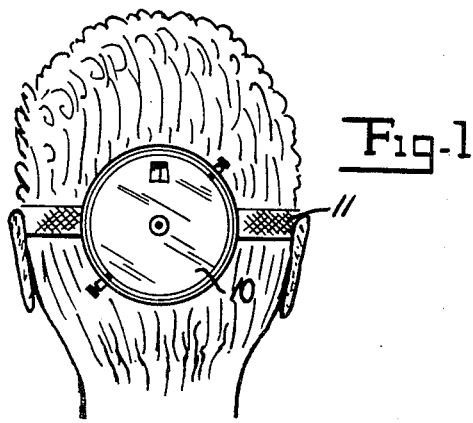
FIG. 1 is a view showing an instrument mounted for use in measuring the flexion of the neck joint.

Referring in detail to the drawings there is shown in FIG. 1 an instrument 10 that is mounted to the rear of a patient's head for measuring the flexion of the neck joint. The instrument is secured to the patient's head by a strap 11 that is attached to the back of the instrument. Although the instrument as shown in FIG. 1 is mounted on the head for measuring the degree of flexibility of a patient's neck, it should be appreciated that the instrument may be attached to various other parts of the human body for measuring the flexibility of the various joints.

The instrument 10 has a shallow cylindrical case 13 (FIG. 3) for housing the sensitive elements of the instrument. The case 13 has an annular wall 14 and a flat back wall 15. To completely enclose the case 13 a transparent face 16 made of transparent plastic or glass is mounted over the end of the case 13 by a bezel strip 17. A stationary shaft 18 is mounted to the back wall 15 and extends forward toward the face 16 along the center axis of the instrument.

A circular dial 20 (FIG. 3) is rotatably mounted on the stationary shaft 18 by a bearing 21. The dial 20 has indicia 22 (FIG. 2) formed thereon for facilitating the accurate measurement of the amount of angular displacement of the instrument as it is moved by the body. The face of the dial is marked off every angular degree from 0 to 360° so that the observer can accurately observe the flexibility of the particular joint being measured.

A pear-shaped weight 24 (FIG. 3) is mounted to the back of the dial 20 spaced from the center axis of the instrument for biasing the dial 20 to a position in which the center of gravity of the weight 24 is immediately below the center axis of the instrument. Specifically, the center of gravity of the weight 24 is located diametrically opposite the 0° mark on the face of the dial, so that when the dial is permitted to freely rotate the 0° mark on the dial will be vertically above the center axis of the instrument.

A dampening device 25 (FIG. 3) is mounted to the back of the dial for dampening the oscillational movement of the dial when it is permitted to freely rotate. The dampening device 25 includes an annular rim 26 that is mounted to the back of the dial near the periphery. The annular rim 26 in radial cross section is U-shaped and faces the back of the dial. When the annular rim is mounted to the back of the dial an enclosed groove 27 is formed therebetween. The annular groove 27 is partially filled with a high density liquid 28 such as mercury to resist the angular movement of the dial by providing a delayed shift of the offset weight created by the liquid.

Figure 2:
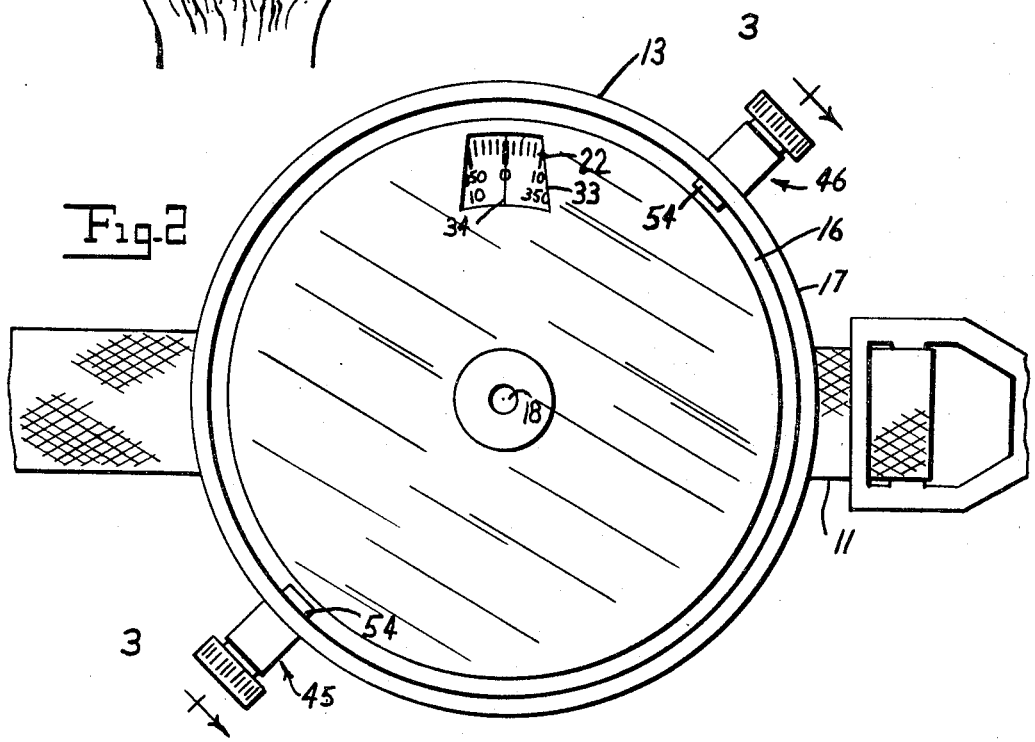
FIG. 2 is a plan view of the instrument.

A spacer ring 30 is mounted on the shaft 18 between the dial bearing 21 and the indicator bearing 32 that rotatably supports a circular indicator 31 on the shaft 18 above the dial 20. The circular indicator 31 has substantially the same diameter as the dial 20 and blocks out the view of the dial as seen in FIG. 2. The indicator 31 has a transparent window 33 formed therein near its periphery for enabling the observer to view a segment of the dial 20. A radial hairline 34 is formed in the window 33 for facilitating the accurate measurement of the angular displacement of the dial with respect to the indicator.

A weight 35 (FIGS. 3 and 4) similar to weight 24 is mounted on the back of the indicator 31 with its center of gravity diametrically opposite the hairline 34. In this manner, when the indicator is permitted to rotate freely the indicator will assume a position in which the hairline 34 overlays the 0° mark on the dial 20.

A dampening device 36 is mounted to the back of the indicator 31 for resisting the angular movement of the indicator. The dampening device 36 is similar to the dampening device 25, and includes rim 37. The rim 37 has an annular section 38 that is adjacent the periphery of the indicator 31. A contoured section 40 extends between the ends of the annular section 38 to bypass the window 33 so as not to obstruct the view through the window. The rim 37 in cross section is U-shaped forming an enclosed groove 41 with the indicator 31. The rim 37 is partially filled with a high density liquid 42, such as mercury, to provide a large high density mass that acts to dampen the oscillation of the indicator 31.

A nut 43 is mounted on the end of the stationary shaft 18 for securing the dial and indicator thereto.

The instrument 10 has locking mechanisms 45 and 46 for selectively preventing the rotation of the dial 20 and the indicator 31 respectively. The locking mechanisms 45 and 46 are mounted to the case 13 diametrically opposed to each other at an approximately 45° angle to the strap 11 as may be viewed in FIG. 2.

Figure 3:
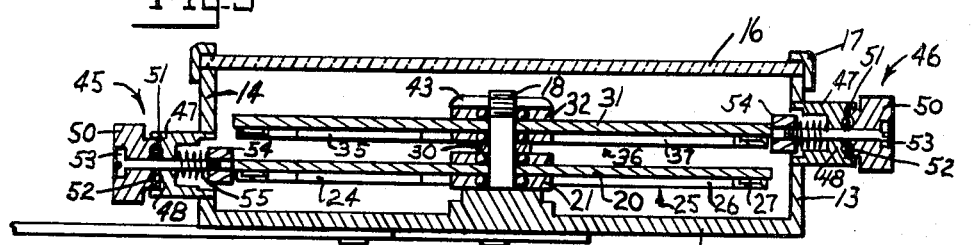
FIG. 3 is a cross sectional view of the instrument taken along line 3—3 in FIG. 2.
Figure 4:
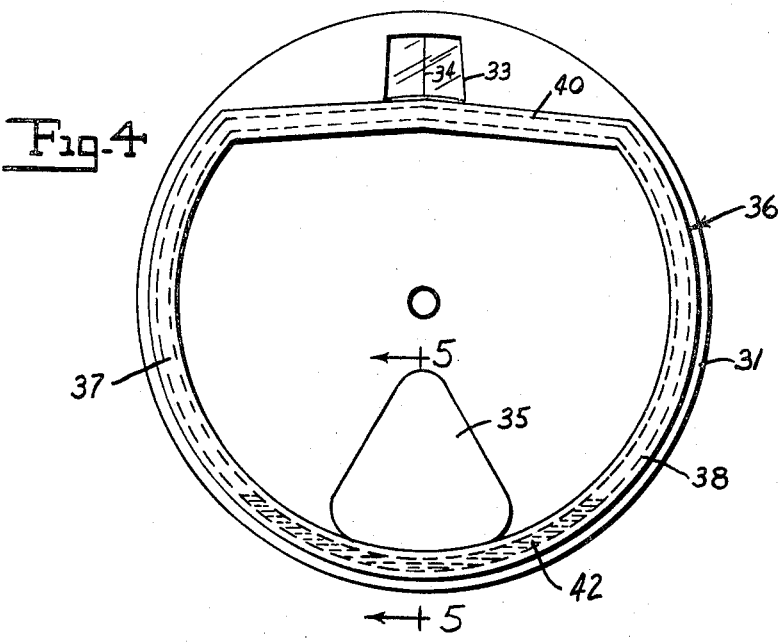
FIG. 4 is a plan view of the back of the indicator particularly emphasizing the dampening device.
Figure 5:
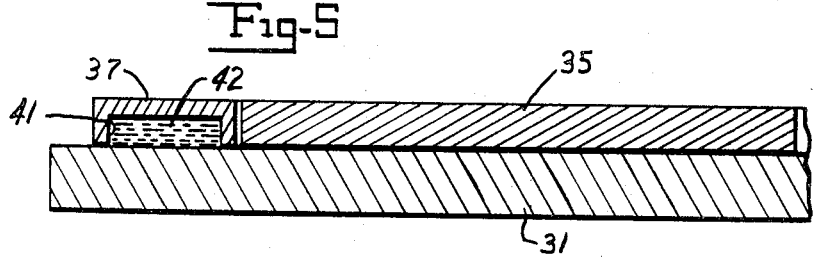
FIG. 5 is a fragmentary cross sectional view taken along line 5—5 in FIG. 4.

The locking mechanism 45 is longitudinally positioned so that it is capable of engaging the periphery of the dial 20 (FIG. 3). The locking mechanism 46 is axially spaced from the locking mechanism 45 for engaging the periphery of the indicator 31 (FIG. 3).

Each of the locking members 45 and 46 has a cylindrical housing 47 opening radially into the interior of the case. The housing has an inner annular shoulder 48 formed therein. A knob 50 is positioned in the outer end of the cylindrical housing 47 engaging the shoulder 48. Detents or balls 51 are mounted in the shoulder 48 in diametrically opposite locations for engagement with sockets or cavities 52 formed in the end of the knob 50. When the balls 51 are angularly aligned with the cavities 52 the knob moves inwardly. The knob 50 has a rod 53 secured thereto that extends through the housing 47. A stop pad 54 made of suitable material such a nylon is mounted on the end of the rod 53 for engaging the periphery of the dial or indicator. A spring 55 is mounted between the stop pad 54 and the shoulder 48, about the rod 53, for biasing the rod inwardly to hold the knob 50 against the shoulder 48.

To prevent the rotation of either the dial 20 or the indicator 31 the operator merely rotates the respective knob 50 until the holes 52 are aligned with and receive the balls 51 thereby enabling the stop 54 to move radially into engagement with the periphery of the selected rotatable member. When the stop pad 54 engages the periphery of the rotatable member, further rotational movement is prevented. To permit rotation the operator merely rotates the knob 50 to move the sockets 52 from the balls 51 to move the rod 53 outwardly to disengage the pad 54 with the periphery.

To measure the flexibility of a part of the human body, the instrument is first strapped to the portion of the body adjaent the joint being tested. For example, to measure the flexibility of the neck from side to side the instrument is strapped to the back of the head as shown in FIG. 1. The dial 20 and indicator 31 are initially permitted to freely rotate to assume the starting position in which the hairline 34 and the 0 degree mark of the dial are in vertical alignment above the center line of the instrument. The operator then rotates the locking mechanism 45 to prevent the dial 20 from rotating. The indicator 31 is left freely rotatable to serve as a standard. The patient then bends his neck to one side as far as possible. At the extreme position the operator rotates the locking mechanism 46 to prevent further rotation of the indicator 31. During the movement of the head the instrument 10 and the dial 20 are rotated while the indicator 31 remained vertically stationary with the hairline vertically above the center axis of the instrument. After the locking mechanism 46 is manipulated to prevent the rotation of the indicator 31 the operator can readily read the angular displacement of the dial with respect to the hairline of the indicator by observing the degree mark aligned with the hairline. After the measurement has been completed, the operator merely rotates the locking mechanisms 45 and 46 180° to unlock the dial 20 and the indicator 31. As soon as the dial 20 is released the weight 24 causes the dial to rotate back to the starting position. The mercury 28 in the enclosed groove 27 resists the rotational and oscillational movement of the dial 20 by attempting to always assume the lowermost level of potential energy. The liquid considerably dampens the oscillation of the dial which would otherwise occur. The weight 24 acts somewhat like a bob on the end of a pendulum.

It has been found that by utilizing the dampening devices 25 and 36 the measuring time has been reduced by 22% to 25%. Considering that over 30 measurements are made per patient, this substantial reduction in the measuring time becomes very significant.

It should be appreciated that the apparatus and structure as shown simply illustrates a preferred embodiment of the invention. The invention is defined in the following claims.

What is claimed is:

1. An instrument for measuring angular body movement having:
    (a) a case for securing to a portion of the human body;
    (b) a calibrated dial mounted in the case for 360° rotational movement about a center axis;
    (c) a first weight mounted to the back of the dial offset from the center axis for biasing the dial to an angular position whereby the center of gravity of the weight is vertically below the center axis;
    (d) a first locking means mounted to the casing for selectively engaging the dial to prevent the rotation of the dial, in combination with the improvement of:
    (e) a circular indicator mounted forward of the dial for 360° rotational movement about the center axis;
    (f) a second weight mounted to the indicator offset from the center axis for biasing the indicator to an angular position whereby the center of gravity of the second weight is vertically below the center axis;
    (g) a second locking means mounted to the casing for selectively engaging the indicator for preventing the rotation of the indicator; and
    (h) dampening means mounted on the dial and indicator for resisting oscillationary movement of the dial and indicator.

2. The device as defined in claim 1 wherein the circular indicator has a transparent window formed therein for observing a portion of the dial and wherein further a radial hairline is formed on the window for accurately measuring the angular displacement of the dial with respect to the indicator.

3. The device as defined in claim 1 wherein the dampening means comprises separate annular dampening devices mounted to the backs of the dial and indicator for independently resisting their angular movements.

4. The device as defined in claim 1 wherein each of the dampening devices includes:
    (a) an annular rim attached to the back of one of the rotatable members with an enclosed groove formed therein, and (b) a high density fluid positioned in a segment of the groove for resisting the angular movement of the rotatable member.

5. The device as defined in claim 4 wherein the high density fluid is mercury.

6. The device as defined in claim 4 wherein a segment of the rim mounted to the back of the indicator is contoured around the window so as not to interfere with the observation of the dial.

7. The device as defined in claim 1 wherein each of the first and second locking means comprises:

(a) a radial cylindrical housing mounted to the case;
(b) a rod slidably mounted in the housing;
(c) a friction pad mounted on the inner end of the rod for engagement with the periphery of the dial or indicator;
(d) a turnable knob mounted to the outer end of the rod, said knob having two diametrically opposite cavities formed in the end thereof;
(e) two balls mounted in the housing for engagement with the cavities to permit the axial movement of the rod when the balls and cavities are angularly aligned and
(f) spring mounted on the rod between the pad and the housing for biasing the rod inwardly.

References Cited

UNITED STATES PATENTS

| | | | |
|---|---|---|---|
| 679,506 | 7/1901 | Krabill | 33—220 |
| 772,090 | 10/1904 | Duquett | 33—220 XR |
| 1,282,030 | 10/1918 | Benemelis | 33—143 |
| 2,565,381 | 8/1951 | Leighton | 33—221 |
| 2,596,422 | 5/1952 | Miller | 33—221 |

WILLIAM D. MARTIN, Jr., *Primary Examiner.*

U.S. Cl. X.R.

33—174, 207